United States Patent Office

3,440,180
Patented Apr. 22, 1969

3,440,180
OXIDATION CATALYST AND PROCESS FOR
USING THE SAME
Ben W. Kiff, Ona, and Norman R. Cox, St. Albans,
W. Va., assignors to Union Carbide Corporation, a
corporation of New York
No Drawing. Continuation of abandoned application Ser.
No. 310,467, Sept. 20, 1963. This application Jan. 7,
1966, Ser. No. 519,009
Int. Cl. B01j *11/32, 11/22*
U.S. Cl. 252—439                                    5 Claims

ABSTRACT OF THE DISCLOSURE

An oxidation catalyst consisting essentially of oxygen-containing compounds of iron, cobalt, molybdenum, and tellurium as metal components therein; wherein the molybdenum component is in chemical combination with oxygen; wherein the iron, tellurium, and cobalt components are in chemical combination with oxygen, the molybdate moiety, and mixtures thereof; and wherein the ratios of the gram-atomic weights of the aforedescribed metal components are defined in definite proportions.

---

This application is a continuation of application Ser. No. 310,467 entitled "Catalyst and Process for Oxidizing Olefins to Unsaturated Aldehydes," by B. W. Kiff and N. R. Cox, filed Sept. 20, 1963, now abandoned, the latter identified application being assigned to the same assignee as the instant application.

This invention relates to novel oxidation catalysts, and to an improved vapor-phase process whereby olefins are oxidized to their corresponding aldehydes in the presence of the aforesaid oxidation catalysts. In various aspects, the invention relates to novel oxidation catalysts consisting essentially of oxygen-containing compounds of iron, cobalt, molybdenum, tellurium, and to vapor-phase oxidation processes whereby 1,2-olefinically unsaturated acyclic hydrocarbons are converted to their corresponding 2,3-olefinically acyclic aldehydes in the presence of the aforedescribed oxidation catalysts.

The production of 2,3-olefinically unsaturated acyclic aldehydes by vapor-phase catalytic oxidation of hydrocarbons is known. Acrolein, the simplest 2,3-olefinically unsaturated lower acyclic aldehyde, and its homolog, methacrolein, are important chemicals of commerce. Known processes for making acrolein and methacrolein include the catalytic oxidation of propylene and isobutylene in the presence of catalysts, such as cuprous or cupric oxide and complex mixtures of the oxides of polyvalent metals. When the reaction is conducted over cupric oxide, gas mixtures are employed in which the olefin is present in excess over oxygen. However, when such gas mixtures are used the concentration of reactants is low and consequently the productivity of the reaction per pass is low. Steam may or may not be used to dilute the gas mixture. The more complex catalysts, e.g., complex mixtures of the oxides of polyvalent metals, usually function best when oxygen is present in excess over the olefin in the reaction gas mixture. When employing the more complex catalysts, the use of steam is considered to be a commercial prerequisite both from a standpoint of controlling the oxidation reaction, i.e., preventing a "run-a-way" reaction, while simultaneously operating at high efficiencies to produce acrolein and acrylic acid when propylene is the olefinic reactant. Though the oxidation reaction will proceed in the absence of steam when using these complex catalysts, e.g., cobalt molybdate type catalysts, it becomes necessary to decrease the percent volume of olefinic reactant in the gas mixture and to decrease the operating temperature. However, lower yields and lower efficiencies result under such conditions.

Numerous side reactions occur during the oxidation of olefins using known catalysts. Various by-products, e.g., undesired aldehydes and ketones, carbon dioxide, carbon monoxide and water, are produced. The formation of these by-products represents a loss in efficiency. The known catalysts referred to above, usually produce the desired aldehydes in low efficiency when the conversion of the olefin starting material is high. In order to maintain a good efficiency, the conversion of olefin must be limited to a fairly low level when using these catalysts. In most of the currently known processes for the vapor-phase oxidation of olefins to their corresponding aldehydes, the temperature of the reaction must be carefully controlled in order to prevent the further formation of unwanted oxidation by-products.

Accordingly, one or more of the following objects will be achieved by the practice of the invention.

It is an object of the invention to provide novel oxidation catalysts consisting essentially of oxygen-containing compounds of molybdenum, cobalt, iron, and tellurium. It is another object to provide an improved novel process for the preparation of olefinically unsaturated oxygenated compounds by the vapor-phase oxidation of their corresponding olefins in the presence of the aforementioned novel catalysts. A further object is to provide novel vapor-phase processes whereby olefins are oxidized to their corresponding olefinically unsaturated aldehydes and/or acids at high efficiencies and conversions. A still further object is to provide novel vapor-phase oxidation processes which are conducted in the absence of steam at high efficiencies and conversions. Further specific objects include novel vapor-phase oxidation processes which are effected in the presence of the novel catalysts to thus convert propylene to acrolein, or isobutylene to methacrolein. These and other objects will become apparent to those skilled in the art from a consideration of this specification.

It now has been discovered that olefinically unsaturated aldehydes, in particular, the 2,3-mono-olefinically unsaturated lower acyclic mono-aldehydes containing from 3 to 4 carbon atoms and having a terminal methylene ($CH_2=$) group on the carbon atom alpha (2-position) to the formyl

group, that is, acrolein and methacrolein, can be conveniently produced from their corresponding olefins by a novel vapor-phase oxidation process utilizing a novel catalyst consisting essentially of oxygen-containing compounds of iron, molybdenum, cobalt, and tellurium.

This novel catalyst has been found to catalyze the vapor-phase oxidation reaction of olefins to unsaturated aldehydes at excellent efficiencies and conversions. Moreover, the use of the novel catalyst in the vapor-phase oxidation reaction results in processes which are preferably effected in the absence of steam since the problems associated with "run-a-way" reaction temperatures are not manifest. The novel oxidation catalysts are of particular advantage if the vapor-phase oxidation process is to be carried out in a cyclic system. In such system, the problems which are attendant with the disposition of large volumes of water are avoided. Also, the novel catalyst can be used in reactors heated with commonly used liquid heating media, such as "Dowtherm" (a heat exchange medium comprising a mixture of diphenyl and diphenyl ether). Furthermore, the use of the novel catalysts disclosed herein eliminates the critical temperature control problems inherent in vapor-phase oxidation processes currently employed. In general, therefore, the employment of the novel catalysts in the novel vapor-phase oxidation process which is conducted in the absence of steam added thereto results in several economic and commercial advantages which include, for example, utility savings, decreased equipment requirements (more throughout per-unit volume of reactor), elimination of water handling problems, etc. These advantages acrue while still giving comparable product yields as are obtained by commercial processes which employ steam.

As indicated previously, the novel catalysts consist essentially of oxygen-containing compounds of iron, cobalt, molybdenum, and tellurium. The novel catalysts are further characterized in that molybdenum component is in chemical combination with oxygen such as an oxide or a molybdate, whereas each of the remaining three components, i.e. iron, cobalt, and tellurium, is chemically bonded to oxygen, e.g., metal oxide, etc., or to the molybdate moiety, e.g., cobalt molybdate, iron molybdate, mixed metal molybdates, etc. In preferred aspects, the novel catalysts consist essentially of physical and chemical combinations of cobalt molybdate, iron molybdate, iron oxide, cobalt oxide, molybdenum oxide, and/or tellurium chemically bonded to oxygen, e.g., oxide, tullurate, etc. or to the molybdate moiety, providing, of course, that the choice of these oxygen-containing compounds is such that the four metal components enumerated above will always be present in one form or another in the catalyst. A highly preferred aspect involves a combination of cobalt molybdate, iron oxide and/or iron molybdate, and an oxide of tellurium. A minor quantity of cobalt oxide and/or molybdenum oxide may be present in this highly preferred aspect.

The ratio of the gram-atomic weights of the metal components of the novel catalyst may be conveniently expressed by the following formula:

$$Fe_aCo_bMo_cTe_d$$

wherein $a$ is a number from 0.01 to 10.0, wherein $b$ is a number from 0.50 to 2.0, wherein $c$ is a number from 0.50 to 2.0, and wherein $d$ is a number from 0.01 to 0.10. It has been found that best results are achieved when $a$ is about one, $b$ is about one, $c$ is from about 0.03 to about 0.4, and $d$ is from about 0.01 to about 0.1. In general, the novel catalyst can be prepared by any one of numerous processes for catalyst preparation known in the art, and its method of preparation is not considered to be narrowly critical. In particular, and preferably, it is prepared by a novel process involving precipitation from mixed solutions of iron, cobalt and molybdenum salts, e.g., chlorides, bromides, nitrates, phosphates, and the like. This is done by mixing aqueous solutions of iron and cobalt salts with an aqueous solution or suspension of molybdic acid or a molybdic acid salt, e.g., chlorides, bromides, nitrate, phosphates, and the like; adding ammonia; drying the resulting precipitate; and heating it to a temperature in the range of from about 400° C. to about 700° C. to give a calcined solid. Tellurium is conveniently added to this calcined solid as an aqueous solution of telluric acid.

The catalyst may be used in either a fixed-bed or fluidized-bed-reactor. If used in a fixed-bed, it may be formed into tablets or pellets or deposited on any of the inert materials commonly used as catalyst supports. Alternately, an inert diluent such as a finely divided silica, Alundum, silicon carbide, alumina-silica, titania and other chemically inert materials may be incorporated as the catalyst is prepared.

The novel vapor-phase oxidation process of this invention is executed by contacting a gaseous reaction mixture comprising an olefin and oxygen in the presence of the aforementioned novel catalyst.

By the term "olefin" as used herein, with reference to the gaseous reaction mixture, is meant a 1,2 - monoolefinically unsaturated acyclic hydrocarbon. Those olefins which contain from 3 to 4 carbon atoms and have from one to two terminal methyl ($CH_3$—) group(s) on the carbon atom in the number 2 position are preferred, that is, propylene and isobutylene. Thus, this invention is directed particularly to the oxidation of propylene and isobutylene. The novel process is applicable to individual olefins as well as to mixtures of olefins, and to propylene and isobutylene in admixture with other hydrocarbons, for example, propylene-propane or isobutylene-isobutane mixtures.

By the term "oxygen" as used herein, with reference to the gaseous reaction mixture, is meant oxygen supplied either in the form of air or as free molecular oxygen. If desired, any one of a number of inert gases may be used to dilute the air or oxygen, and will, therefore, constitute a percent by volume of the total gaseous reaction mixture. Such diluents would include nitrogen, carbon dioxide, carbon monoxide, helium, and the like. Undiluted air is the preferred source of oxygen (about 20 percent by volume oxygen) because it is the least expensive and readily available.

The proportion of olefin is the gaseous reaction mixture can vary within moderately wide limits. In general, from about 1 to about 20 by volume of olefin is satisfactory. The preferred range being from about 2.5 to about 10 percent by volume of olefin in the gaseous reaction mixture. This latter range is particularly preferred with the olefins propylene and isobutylene.

The proportion of oxygen in the gaseous reaction mixture can also vary within moderately wide limits. In general, from about 1 to about 20 percent by volume of oxygen is satisfactory. The preferred range being from about 4 to about 15 percent by volume of oxygen.

Alternatively, a molar ratio of oxygen to olefin between about 0.5:1 to 10:1 gives satisfactory results, with a molar ratio of oxygen to olefin of about 2:1 being preferred.

The temperature at which the process of the invention is conducted can vary considerably depending upon the atomic ratio of the components in the catalyst, the particular olefin being oxidized, the contact time and the percent or ratio of olefin and oxygen in the gaseous reaction mixture. In general, the temperature can range from about 250° C. to about 500° C., with a preferred temperature range of from about 350° C. to about 425° C. As disclosed herein, an advantage of the present invention is the absence of critical temperature control problems present in known prior art processes.

The apparent contact time employed in the process is not especially critical and it may vary from about 0.5 to about 40 seconds. The preferred apparent contact time is within a range of from about 1 to about 10 seconds, with a most preferred apparent contact time of from about 2 to about 6 seconds. The "apparent contact time" may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture. The optimum contact time will, of course, vary depending upon the olefin being treated, but in the case of propylene and isobutylene, the preferred apparent contact time is from about 2 to about 6 seconds.

The vapor-phase oxidation process of this invention can be conducted at atmospheric, superatmospheric, or subatmospheric pressure. A preferred pressure range is from about 5 p.s.i.a. to about 150 p.s.i.a. The most preferred pressure is atmospheric pressure, i.e., about 15 p.s.i.a. As stated above, pressures other than atmospheric may be employed in this process, but it is generally preferred to operate at or near atmospheric pressure since the reaction proceeds well at such pressure and the use of expensive high pressure equipment is thereby avoided. This is a further advantage of the present vapor-phase oxidation process.

The novel process is effected in the absence of steam added thereto especially in view of the numerous economical, commercial, and processing advantages which result therefrom. Consequently, the objectionable features, as intimated previously, which are associated with a process in which large quantities of steam are used are obviated. This is of particular advantage if the process is to be operated in a cyclic system in which much of the gaseous reaction mixture is recycled to the reactor after the desired products have been removed. In such a system when steam is employed, it must be continuously added to the reactor and liquid water removed from the reactor. However, since the use of the novel catalyst results in unexpected and unobvious process and product advantages in the vapor-phase oxidation process effected in the absence of extraneous steam thereto, the costly and complicated operation and attendant disadvantages alluded to above, are avoided and not experienced. However, extraneous steam can be employed in the novel process as is evident from the operative examples contained herein.

In general, any apparatus of the type suitable for carrying out oxidation reactions in the vapor-phase may be employed for the execution of the novel process. The process may be operated continuously or intermittently in the reactor. The reactor may be a fixed-bed or fluidized-bed reactor as noted hereinabove. It is preferred for convenience, however, to employ a reactor containing a so-called "fixed" bed of catalyst. Fixed bed reactors are well-known in the art.

The reactor may be brought to the reaction temperature before or after the introduction of the vapors to be reacted. In a large scale operation, it is preferred to carry out the process in a continuous manner and in this system the recirculation of unreacted olefin and/or oxygen is contemplated. Periodic regeneration or reactivation of the catalyst is also contemplated.

In an over-all preferred form of the invention, a gaseous reaction mixture composed of from about 4 to about 20 percent by volume of oxygen is introduced, as air, into the reactor with from about 2.5 to about 10 percent by volume of propylene or isobutylene. This gaseous reaction mixture is passed over a pelleted catalyst consisting essentially of oxygen-containing compounds of iron, cobalt, molybdenum, and tellurium, wherein the gram-atomic weight ratio of cobalt to molybdenum is about one, wherein the gram-atomic weight ratio of iron to molybdenum ranges from about 0.03 to about 0.4, and wherein the gram-atomic weight ratio of tellurium to molybdenum ranges from about 0.01 to about 0.10. The catalyst bed temperature is from about 350° C. to about 425° C., and the apparent contact time is from about 2 to about 6 seconds.

In addition to the desired unsaturated aldehydic product, some of the olefin is converted to valuable unsaturated acid. In the case of the oxidation of propylene some acrylic acid is formed in addition to the desired acrolein. From the oxidation of isobutylene, in addition to methacrolein, some methacrylic acid is formed.

The desired unsaturated aldehydes prepared according to this invention can be recovered from the effluent gas stream by any suitable method known in the art. For instance, from the oxidation of propylene the effluent gas may be passed through a water scrubber. Acrolein, as well as any acrylic acid, are dissolved in the water and may be separated from the aqueous solution by conventional means such as distillation or extraction with an appropriate solvent. The gas from which the acrolein has been removed can be recycled to the reactor to further react the contained olefin and oxygen, or it may be treated in a known manner to isolate the hydrocarbons for further use. The efficiency of the scrubbing operation can be improved when water is employed as the scrubbing agent by adding suitable wetting agents to the water. Wetting agents suitable for this use are known in the art.

If desired, the scrubbing of the reaction gases may be preceded by a cold water quench of the gases which of itself will serve to separate as significant amount of the desired unsaturated aldehydes. An inhibitor to prevent polymerization of the desired unsaturated aldehydes, as is well known in the art, may be added at any stage.

If desired, the exit gases containing unreacted olefin and unsaturated aldehydes, can be passed over a second catalyst of a type known in the art, such as cobaltmolybdenum oxides, for oxidation of the unsaturated aldehydes to the corresponding unsaturated acids.

The vapor-phase process for oxidizing olefins to unsaturated aldehydes over the catalyst of this invention is characterized by the high conversion of olefin accompanied by high efficiency of formation of the desired products. In the oxidation of propylene to acrolein conversions as high as 82 percent have been obtained with total efficiency to acrolein and acrylic acid as high as 77 percent. At somewhat lower conversion total efficiencies as high as 86 percent have been realized.

Efficiency is herein expressed as the percent of starting olefin reacted and converted to the desired aldehyde. Efficiency is calculated, using acrolein as an example, as follows:

$$\text{Efficiency} = \frac{\text{(moles of acrolein produced)} + \text{(moles of acrylic acid produced)}}{\text{(moles of propylene fed to reaction system)} - \text{(moles of unreacted propylene recovered)}} \times 100$$

Conversion is defined herein as the percent of starting olefin reacted regardless of the nature of the resultant product(s), and is calculated (using propylene as an example) as follows:

$$\text{Conversion} = \frac{\text{(moles of propylene fed to reaction system)} - \text{(moles of unreacted propylene recovered)}}{\text{(moles of propylene fed to reaction system)}} \times 100$$

It is pointed out at this time that the compounds "cobalt oxide," "iron oxide," "molybdenum oxide," and "tellurium oxide" include these metal oxides in their various oxidation state, e.g., cobaltous oxide, cobaltic oxide, ferrous oxide, molybdenum sesquioxide, molybdenum dioxide, molybdenum trioxide, and the mono-, di-, and trioxides of tellurium.

The following examples are illustrative.

Example 1.—Preparation of catalyst

The novel catalyst consisting essentially of oxygen-containing compounds of iron, cobalt, molybdenum, and tellurium was prepared as follows:

610 grams of ammonium molybdate was mixed with 690 grams of water to form an ammonium molybdate-water mixture. This mixture was then heated to 60° C. 1000 grams of cobalt nitrate was then dissolved in 1000 grams of water to form a cobalt nitrate solution. To this cobalt nitrate solution was added 101 grams of ferric nitrate [$Fe(NO_3)_3 \cdot 9H_2O$]. After addition of the ferric nitrate to the cobalt nitrate solution, this ferric nitrate-cobalt nitrate solution was then added to the ammonium molybdate-water mixture, with stirring, while the temperature of the resulting mixture was maintained at 55–60° C. After the addition of the ferric nitrate-cobalt nitrate solution of the ammonium molybdate-water mixture, the resulting mixture was stirred for an additional 10 minutes. 332 grams of 28 percent ammonium hydroxide was mixed with 350 grams of water, and this solution was added to the above resulting mixture with stirring. Upon addition of the ammonium hydroxide solution to the resulting mixture, a precipitate formed which was filtered and washed three times with 1500 ml. portions of water. The washed precipitate was then roasted in a muffle furnace for 16 hours at 600° C. The roasted precipitate was ground to a fine powder and thoroughly mixed with an aqueous solution containing 6.5 grams telluric acid. The precipitate-aqueous telluric acid-mixture was then dried, and the dried precipitate, that is, catalyst, was formed into 4 x 8 pellets. The catalyst thus prepared had a combination of components with the following gram-atomic ratios: $Fe_{0.072}Co_{1.0}Mo_{1.0}Te_{0.015}$.

The gram atomic ratios in Example 1, and throughout this disclosure, were obtained by calculating the theoretical number of gram-atoms of each of the elements present in the catalyst mixture; and cobalt and molybdenum (present in equivalent gram-atom amounts by intent) were taken as unity, and the remaining elements related to this assigned value.

Example 2.—Oxidation of propylene to acrolein with steam present

The reactor used for the oxidation was a stainless steel tube 4-feet long and one-inch in diameter. The reactor was heated by means of an electrically-wound jacket through which Dowtherm heating oil was circulated. To the bottom of the reactor there was attached a water-cooled condenser through which the effluent gases were passed. To the reactor there was charged 295 ml. of the catalyst (dry volume of 4 x 8 mesh pellets of the catalyst prepared in Example 1).

The gaseous reaction mixture containing air, propylene, and steam then introduced into the reactor. The reaction was conducted under the following conditions:

Oil temperature (Dowtherm) _____° C__ 372
Catalyst bed temperature _____° C__ 395
Gaseous reaction mixture:
    Propylene feed _____liters/hr__ 6.8
    Air feed _____liters/hr__ 117
    Water feed (steam) _____g./hr__ 28
Pressure (atmospheric)
Time of run _____hours__ 4
Contact time (apparent) _____seconds__ 2.9

The results were as follows:

|  | Percent |
|---|---|
| Propylene conversion | 78 |
| Acrolein yield | 48.3 |
| Acrylic acid yield | 10.7 |
| Total efficiency (acrolein+acrylic acid) | 75.7 |

Example 3.—Oxidation of propylene to acrolein with no steam present

This experiment was conducted in the same manner as Example 2, with the exception that no water, as steam, was fed to the reactor with the gaseous reaction mixture containing air and propylene. The temperature of the oil jacket was held at 362° C. and the catalyst temperature was maintained at 395° C. The contact time was 3.7 seconds.

The results were as follows:

|  | Percent |
|---|---|
| Propylene conversion | 82 |
| Acrolein yield | 49.7 |
| Acrylic acid yield | 11.4 |
| Total efficiency (acrolein+acrylic acid) | 72.7 |

Upon comparison of Example 3 with Example 2, it will be seen that both the conversion and yield of acrolein are higher in Example 3 when no steam is present in the gaseous reaction. From Example 3 it can be seen that the present process operates satisfactorily in the absence of steam without loss of efficiency or difficulties in controlling the reaction. This is one of the advantages of the present process as hereinbefore described.

Examples 4 to 7.—Oxidation of propylene to acrolein with no steam present

The following examples were conducted with a gaseous reaction mixture containing air and propylene, without steam substantially in the same manner as Example 3.

| Contact time, sec. | Percent conversion | Percent yield to acrolein | Percent yield to acrylic acid | Percent total efficiency (acrolein+ acrylic acid) |
|---|---|---|---|---|
| 3.7 | 79 | 49.1 | 11.8 | 77.3 |
| 3.8 | 58 | 38.0 | 8.2 | 80.5 |
| 3.7 | 69 | 41.7 | 10.6 | 76.0 |
| 3.7 | 67 | 41.0 | 11.8 | 79.0 |

Example 8.—Preparation of catalyst with high iron content

A catalyst was prepared in the same manner using the same amounts of ingredients as in Example 1, but four times (404 grams) as much iron nitrate $[Fe(NO_3)_3 \cdot 9H_2O]$ was used. This gave a catalyst in which the gram-atomic ratios were: $Fe_{0.288}Co_{1.0}Mo_{1.0}Te_{0.015}$.

Instead of pelleting this catalyst, 200 grams of the powdered material was deposited on 400 grams of 4 x 8 aloxite.

Example 9.—Oxidation of propylene over catalyst with high iron content with steam present To the reactor described in Example 2, there was charged 425 ml. (dry volume) of the catalyst prepared in Example 8. The gaseous reaction mixture containing air, propylene, and steam was then introduced into the reactor. Propylene was oxidized under the following conditions:

Oil temperature (Dowtherm) _____° C__ 370
Catalyst bed temperature _____° C__ 388–390
Gaseous reaction mixture:
    Propylene Feed _____liters per hr__ 6.8
    Air Feed _____do____ 117
    Water Feed (steam) _____g. per hr__ 67
Pressure (atmospheric)
Time of run _____hours__ 5
Contact time (apparent) _____seconds__ 3.2

This catalyst gave high production of carbon oxides, and high conversion with consequent low efficiency.

The results were as follows:

|  | Percent |
|---|---|
| Propylene conversion | 82 |
| Acrolein yield | 44.5 |
| Acrylic acid yield | 3.4 |
| Total efficiency (acrolein+acrylic acid) | 58.8 |

Example 10.—Preparation of catalyst with low iron content

A catalyst was prepared in the same manner as in Example 1, using the same amounts of ingredients, but only one half (50.5 grams) as much iron nitrate $[Fe(NO_3)_3 \cdot 9H_2O]$ was used. The catalyst was pelleted in 4 x 8 size as in Example 1.

The metal components of this catalyst were present in the following gram-atomic ratios: $Fe_{0.036}Co_{1.0}Mo_{1.0}Te_{0.015}$.

Example 11.—Oxidation of propylene over catalyst with low iron content with no steam present To the reactor described in Example 2, there was charged 350 ml. (dry volume) of the catalyst prepared in Example 10. While the oil jacket temperature was maintained at 385° C. and the catalyst temperature was held between 400 and 408° C., a mixture of 7.77 liters per hour of propylene and 117 liters per hour of air was passed over the catalyst. The run was continued for 7½ hours. Of the propylene fed, 51 percent reacted. The yield to acrolein was 36.6 percent and the yield to acrylic acid was 10 percent. The total efficiency to acrolein plus acrylic was 86.8 percent.

The foregoing examples are intended merely as illustrations of this invention and are not to be construed as limitations upon the scope thereof. Various modifications of the reaction conditions described will be readily apparent to those skilled in the art.

What is claimed is:

1. An oxidation catalyst consisting essentially of oxygen-containing compounds of iron, cobalt, molybdenum, and tellurium as metal components therein; wherein the molybdenum component is in chemical combination with oxygen; wheren the iron, tellurium, and cobalt components are in chemical combination with a member selected from the group consisting of oxygen, the molybdate moiety, and mixtures thereof; wherein the ratios of the gram-atomic weights of the aforedescribed metal components as expressed by the formula $$Fe_aCo_bMo_cTe_d$$

are as follows: $a$ is a number in the range of from 0.01 to 10.0, $b$ is a number in the range of from 0.50 to 2.0, $c$ is a number in the range of from 0.50 to 2.0, and $d$ is a number in the range of from 0.01 to 0.10.

2. The oxidation catalyst of claim 1 wherein the metal components consist essentially of those selected from the group consisting of cobalt molybdate, iron molybdate, iron oxide, cobalt oxide, molybdenum oxide, and tellurium which is chemically bonded to oxygen.

3. The oxidation catalyst of claim 1 wherein the metal components consist essentially of cobalt molybdate, iron oxide, and tellurium oxide.

4. The oxidation catalyst of claim 1 wherein the metal components consist essentially of cobalt molybdate, iron molybdate, iron oxide, and tellurium oxide.

5. The oxidation catalyst of claim 1 wherein the metal components consist essentially of cobalt molybdate, cobalt oxide, iron oxide, and tellurium oxide.

References Cited

UNITED STATES PATENTS

| | | | |
|---|---|---|---|
| 3,159,688 | 12/1964 | Jennings et al. | 252—470 |
| 3,177,257 | 4/1965 | Detling et al. | 260—604 |
| 3,192,259 | 5/1965 | Fetterly et al. | 260—604 |
| 3,198,753 | 8/1965 | Traina | 252—470 |
| 3,232,887 | 1/1966 | Pessimisis | 252—470 |
| 3,240,806 | 3/1966 | Bethell et al. | 260—604 |
| 3,347,899 | 10/1967 | Caproali et al. | 252—439 XR |
| 3,392,189 | 7/1968 | Eden | 252—434 XR |

FOREIGN PATENTS 878,803  10/1961  Great Britain.

OTHER REFERENCES

Derwent Belgian Patents Report, No. 82B issued Dec. 22, 1961, page A14.

PATRICK P. GARVIN, *Primary Examiner.*

U.S. Cl. X.R.

252—434; 260—604